…

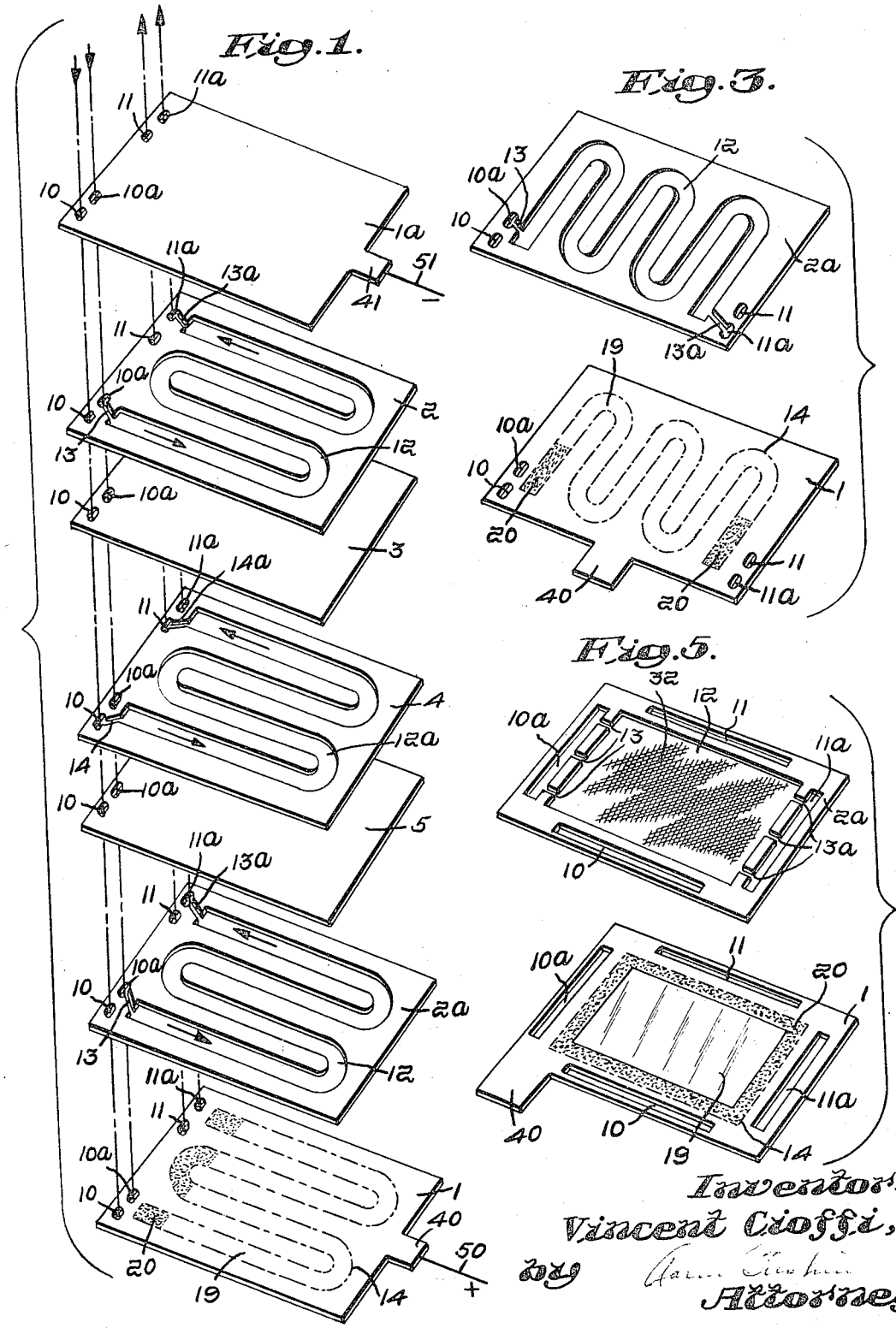

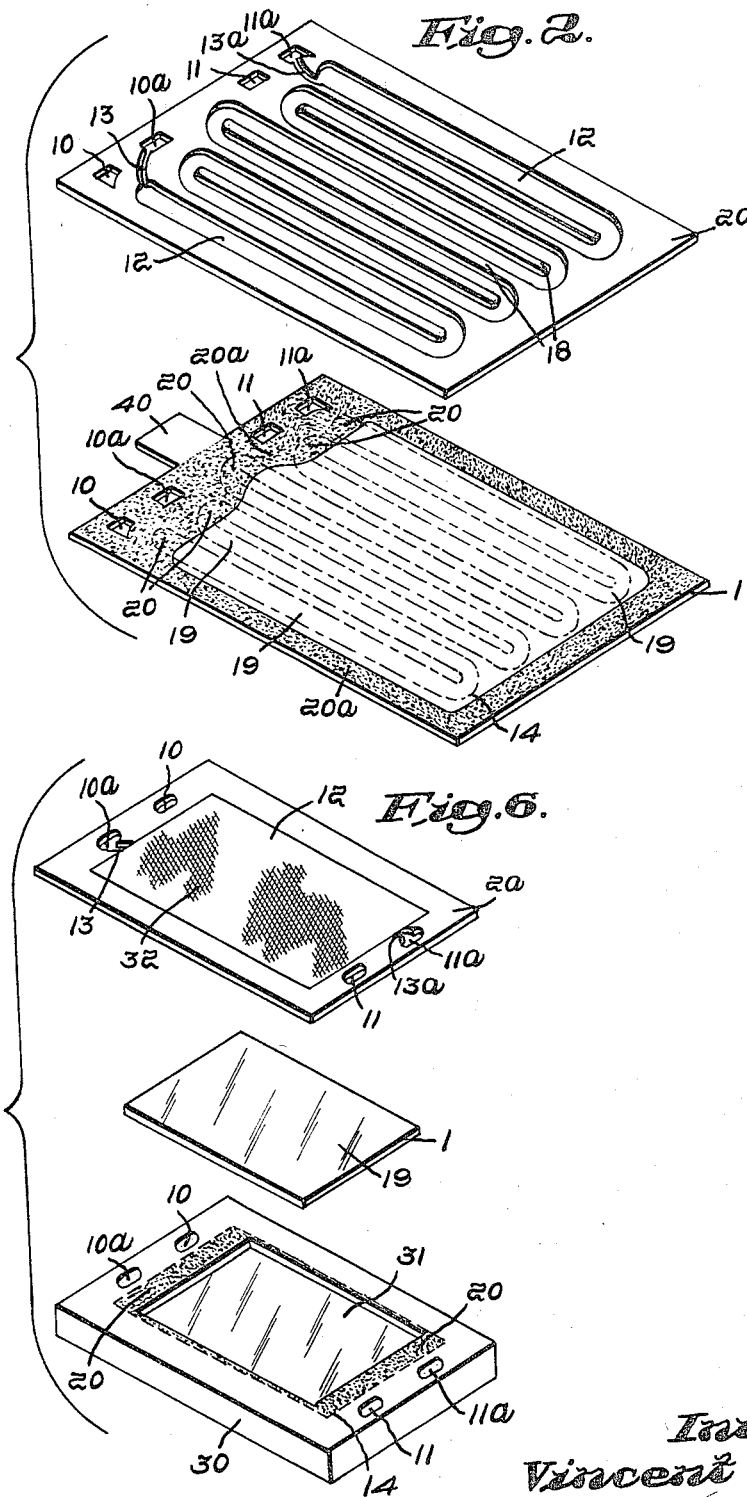

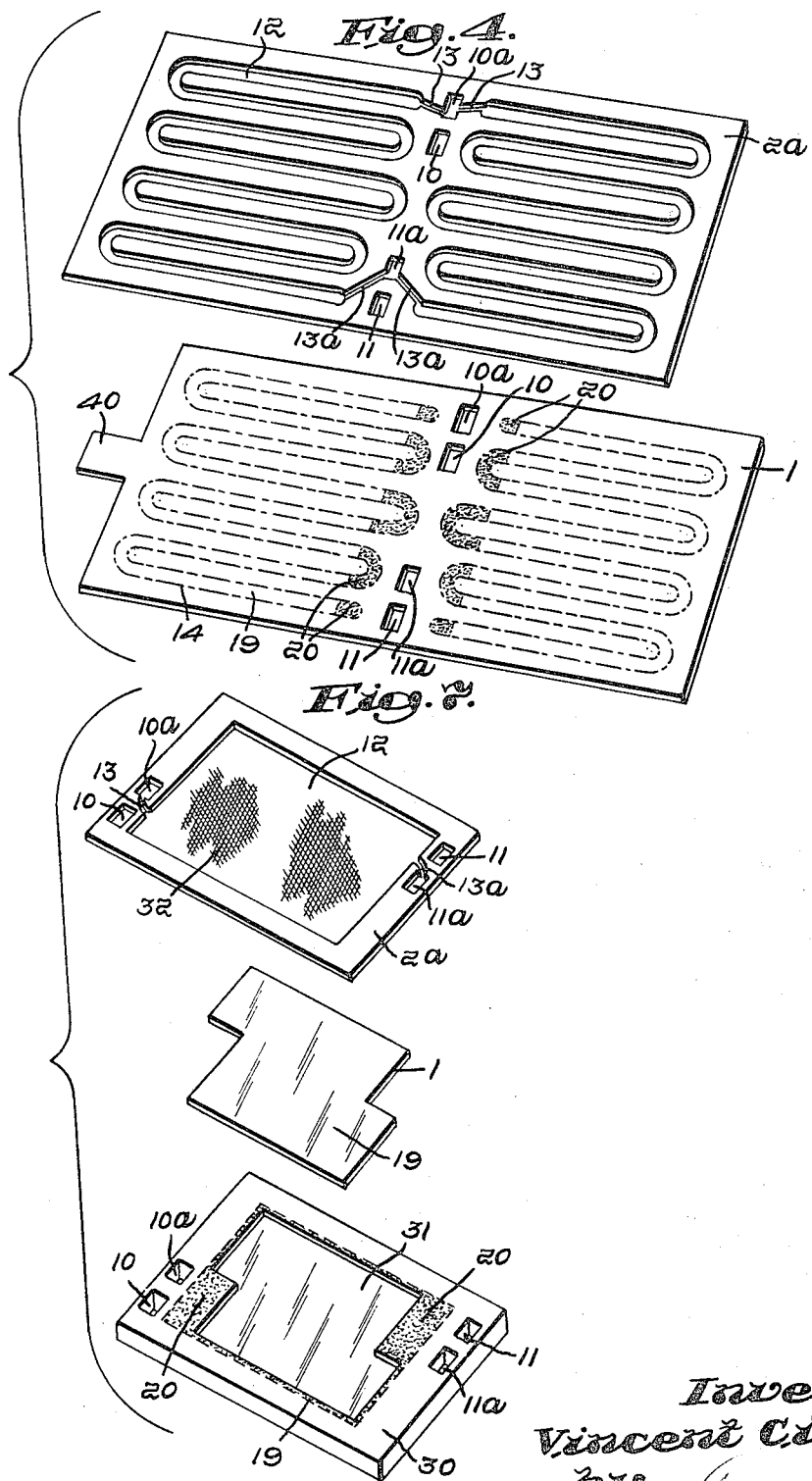

United States Patent Office 3,291,716
Patented Dec. 13, 1966

3,291,716
NOBLE METAL COATED VALVE METAL ELECTRODES USEFUL IN ELECTRODIALYSIS SYSTEMS
Vincent Cioffi, Somerville, Mass., assignor to Ionics, Incorporated, Cambridge, Mass.
Filed June 24, 1963, Ser. No. 289,815
4 Claims. (Cl. 204—301)

This invention relates to electrodialysis systems employing conductive solutions, and more particularly to novel electrodes utilized in electrodialytic systems for treating electrolyte solutions.

This application is a continuation-in-part of application No. 144,360, now abandoned, filed on October 11, 1961.

Electrodialysis apparatus and systems for removing undesirable ions from electrolytic solutions are well known in the art. Such apparatus has been used, for example, to demineralize and/or remove salt and the like from water.

Electrodialysis is a well known process for the removal of electrolytes from brackish and sea waters and from various industrial solutions. The process transfers electrically charged ions through permselective ion-exchange membranes or barriers as a result of the application of electrical energy. A satisfactory electrodialysis system for use in such processes comprises at least one anion-exchange membrane and at least one cation-exchange membrane confined between a pair of electrodes (one being an anode, the other a cathode). The ion-exchange membranes are preferably separated from one another and from the electrodes by so-called spacer members which define the liquid chambers of the electrolytic apparatus. These spacers will be described with more particularity hereinafter. While a system utilizing a single anion-exchange membrane and a single cation-exchange membrane is feasible, in commercial utilization of such systems a plurality of anion-exchange membranes, spacer members and cation-exchange membranes are stacked between two electrodes, thereby increasing the capacity and efficiency of the system in deionizing solutions. An electrodialysis unit generally comprises a plurality of diluting or deionizing chambers (for the product stream) alternately disposed between a plurality of salt concentrating chambers (for the waste stream) and, in addition, at least two terminal electrode chambers containing a cathode and anode respectively for passage of a direct current transversely through the unit. The diluting and concentrating chambers which are comprised of spacer members are disposed between the terminal electrodes and separated from each other by alternately placed anion permeable and cation permeable membranes. In operation, the dissolved ionized salts of a liquid are transferred through the appropriate membranes from the deionizing chambers into the salt concentrating chambers by means of a direct current applied across the membranes and chambers. In this manner the ionized salts collect in the concentrating or waste chambers and are continuously carried away through discharge outlets. The solution in the diluting chambers is collected from discharge outlets as a substantially salt-free liquid. The combination of a deionizing and concentrating chamber constitutes a cell pair. A large number of cell pairs may be stacked between a pair of electrodes to produce a multi-cell electrodialysis unit. Such systems showing the arrangement of membranes and electrolyte streams and the method of operation to effect demineralization are more fully described in U.S. Patents Nos. 2,708,658, 2,826,544, and many others. The manufacture and properties of ion-selective membranes are fully disclosed in U.S. Patents Nos. 2,730,768, Re. 24,865, and others.

In electrodialysis systems such as described above, when a direct current voltage is applied across the terminal electrodes, the current ideally flows perpendicularly through the face of each conducting ion-exchange membrane and through each spacer via the flowing electrolytic solution contained within the liquid flow path areas of said spacers. The heat generated by the flow of current therethrough is dissipated by the cooling effect of the flowing electrolyte, as will be appreciated by those skilled in the art, thereby precluding any "burning" or heat damage to the membranes and/or spacers. While the current will ideally flow through the membranes and liquid flow areas in the manner described above, it has been found that in certain types of electrodialysis systems, the electric current tends to flow laterally through areas of the membranes which are gasketed by the spacers. Since these gasketed membrane areas are not in contact with flowing electrolyte solution they are therefore not cooled sufficiently to dissipate the heat generated by the lateral flow or shorting of electricity. This results in a "burning" or heat damage to the membrane and spacers in said area.

It is to the problem of lateral shorting and the resulting "burning" or heat damage of the components of electrodialysis system to which this invention is directed.

It is therefore a primary object of this invention to provide novel electrodialysis systems wherein the problem of "burning" due to lateral shorting is either completely obviated or at least materially reduced to the point where it is inconsequential.

Another object of this invention is to provide novel electrodes for use in electrodialysis systems wherein lateral shorting has been found to occur.

Another object is to provide novel electrode arrangements for use in electrodialysis systems wherein the electrodes are designed and constructed so as to allow current to pass through only certain portions of the adjacent spacer's flow path area.

Another object is to provide electrolytically conductive electrodes for electrodialysis systems having such size and shape so as to prevent current from transversing the adjacent spacer's entire liquid flow path area.

Still another object is to provide novel electrodes containing electrically non-conductive surface areas so spaced and arranged as to prevent or at least materially reduce lateral shorting.

Various other objects and advantages will appear from the following description of the invention and the novel features will be particularly pointed out hereinafter in connection with the appended claims.

For a fuller understanding of the invention, reference should be had to the following detailed disclosure taken in conjunction with the accompanying drawings in which:

FIGURE 1 is a perspective view of a novel electrodialysis system of this invention shown in its simplest form and showing the structural elements in exploded relationship with one another.

FIGURES 2 to 7 show perspective views of various modifications of the novel electrodes of this invention in exploded relationship with an adjacent spacer: each modification being determined by the particular flow path design of the spacers employed in the electrodialysis stack.

In FIGURES 2 to 5 certain areas of the electrode, per se, are provided with non-conductive areas to prevent lateral shorting. In FIGURES 6 and 7 the total electrode area is conductive, the non-conductive area required to prevent lateral shorting being provided by a non-conducting block portion which is not part of the electrode, per se.

As shown in the drawings and in particular to FIGURE 1, the electrodialysis systems to which this invention is directed may comprise at least one cation-exchange membrane 3 and anion-exchange membrane 5 confined between a pair of electrodes 1 and 1a. The electrodes 1 and 1a are connected to a source of direct current (not shown) through leads 50 and 51, respectively. The leads make contact with the electrodes by any convenient connecting means such as electrode tabs 40 and 41. When a direct current voltage is impressed upon the electrodes, one of them becomes a cathode and the other an anode. For purposes of illustration, electrode 1 is the anode and 1a is the cathode. Membranes 3 and 5 are preferably present as a plurality of alternating anion- and cation-exchange membranes, each separated from one another by spacer members such as 2 and 4. Spacer members may also separate the end membranes from the respective electrodes adjacent thereto.

As will be seen from the drawings, both the membranes and the spacers are provided with at least one and preferably two or more manifold inlet holes and outlet holes for the passage of liquids therethrough. Preferably the electrodes are also provided with manifold inlet holes and outlet holes. For purposes of illustration, electrodes 1 and 1a, spacer members 2, 4 and 2a, and membranes 3 and 5 are shown to have a pair of manifold inlet holes 10 and 10a and a pair of manifold outlet holes 11 and 11a. As shown in FIGURE 1 the manifold holes are round or oval and are all located on the same side of the membranes, spacers and electrodes. However, it is to be understood that a wide variety in the size, shape, number and location of the manifold holes may be employed. The electrodes, spacers and membranes are so constructed and arranged that the inlet and outlet holes of the respective elements are aligned with one another, whereby the influent solution, such as for example a concentrated electrolyte, may pass through manifold inlet holes 10 or 10a of electrode 1a, through the various spacers and membranes and out manifold holes 11 or 11a of the respective members to a common effluent pipe or receptacle (not shown). Each spacer member of an electrodialysis stack is provided with a similarly designed flow path area connecting from one of the inlet or influent holes to one of the effluent or outlet holes whereby the electrolyte is caused to flow along and in contact with the adjacent ion-exchange membranes or electrodes. As shown in the drawing of FIGURE 1, spacer members 2 and 2a are provided with a tortuous flow path 12 which is similarly connected to inlet hole 10a and outlet hole 11a by connecting channels 13 and 13a respectively. Spacer member 4 is also shown provided with a tortuous flow path 12a connected to inlet hole 10 and outlet hole 11 by connecting channels 14 and 14a, respectively. Generally the connecting channels are narrow slits or notches in the spacer material that merely function to connect the flow path area of each spacer with the appropriate inlet and outlet manifold hole. For purposes of this disclosure the channel cuts are not considered to be part of the spacer's liquid flow path area. Thus, liquid entering through manifold inlet hole 10a of electrode 1a is directed by connecting channel 13 through flow path 12 of spacers 2 and 2a thereby flowing tortuously along and in contact with the adjacent electrodes and ion-exchange membranes. Liquid entering through manifold inlet hole 10 of electrode 1a passes directly through manifold inlet hole 10 of spacer member 2 (as it cannot enter flow path 12) and enters the flow path 12a of spacer member 4 via channel 14, thereby flowing tortuously along and in contact with adjacent ion-exchange membranes 3 and 5. In a system utilizing a plurality of alternating anion- and cation-exchange membranes, alternating spacer members 2 and 4 are provided, thereby causing liquid entering inlet holes 10 or 10a to flow through alternating spacer members.

In operation, a direct current is impressed across the electrodes and an electrolyte solution, such as, for example, an aqueous salt solution, is fed into influent manifold 10 and 10a of top electrode 1a, from which it flows by gravity or pressure down through the manifold holes of various membranes and spacers toward the bottom electrode. The solution of course may, in the alternate, be fed by pressure into influent manifold holes 10 and 10a of the bottom electrode up through the various manifold holes toward the top electrode. As the electrolyte solution flows through the manifold holes a portion thereof passes from influent hole 10a into the alternating spacer members such as 2 and 2a, wherein it is caused to flow tortuously along and in contact with the adjacent ion-exchange membranes or electrode to effluent holes 11a. Similarly a portion of the solution fed into manifold hole 10 passes into each of the alternating spacer members 4 wherein it is caused to flow tortuously along and in contact with the adjacent ion-exchange membranes to effluent hole 11.

In a manner well known in the art, the electric current passes from one electrode to the other via the various membranes and electrolyte solution contained in the spacers flow areas. Thus, on passage of direct current through the system and on flowing electrolyte solution through the various spacers, cations and anions will be selectively carried toward the cathode and anode respectively through the ion-selective membranes, thereby demineralizing the solution, at least in part, and permitting recovery of the demineralized or dilute solution from a manifold outlet hole. While, for purposes of simplicity, a single flow path has been illustrated in the spacer members, it will be appreciated that a plurality of such flow paths in side-by-side relationship may be channeled from a common inlet hole to a common outlet hole. A plurality of such flow paths are generally employed to obtain a greater efficiency and consequently a greater output from the system. Also, it is not necessary that all the manifold holes be located on one side of the spacer or that the flow path be of a tortuous design. As is well known in the art, various flow path configuration and manifold hole locations may be employed in spacers which are to be used in electrodialysis processes. Some of these variations are shown in FIGURES 2 to 7. Of course it is apparent that wherever the manifold holes of the spacers are located, the holes of the other elements of the electrodialysis stack must be similarly located so as to be aligned with one another.

The foregoing description applies to the structures and operation of electrodialysis systems heretofore known in the art, as previously mentioned. Such a system therefore does not per se describe the inventive subject matter of this application, but is described in order to make the present invention more clearly understood.

In electrodialysis systems, the direct current utilized flows from one electrode to the other in a direction perpendicular to the face of the conductive ion-exchange membranes and also through the spacers' flow path by way of the electrically conductive solution flowing in the flow path area of said spacers. Ideally the current flows only through the areas of the membranes that are defined by the spacers' liquid flow path and not perpendicularly through the membrane area which is gasketed by the spacer material. Therefore, in such cases, the heat generated by the flow of current occurs only in the membrane area on contact with the electrolyte and since the electrolyte solution is flowing, the heat generated therein is dissipated and carried away with the solution.

It has been found, however, that there is a tendency for the current in part to flow in a generally lateral direction from one electrode, through certain gasketed membrane areas toward the adjacent manifold holes containing flowing electrolyte, thence through the manifold holes toward the other electrode, and then laterally again from the manifold holes through the membranes to the other electrode. This lateral shorting transgresses the normally non-conducting gasketing area separating the flow path area from the adjacently placed manifold holes. Since there is no flowing solution contacting said gasketing area, the heat generated from this lateral current is not removed. The lateral current flow is most pronounced in the membranes nearest to the respective electrodes and tends to diminish toward the center of the system, that is, the lateral flow is most pronounced in the membranes nearest the electrodes and is less pronounced in the membranes located furthermost from the electrodes. Thus, all of the membranes in a given system are not necessarily subjected to lateral shorting. The lateral shorting in those membranes so affected causes overheating in the substantially dry gasketed areas nearest to the manifold holes, and the overheating in turn causes a "burning" or heat damage in those areas, thereby interfering with and ultimately incapacitating the system. This lateral shorting and consequent burning of spacers and membranes in this shorting area is caused by the lateral voltage gradient which develops between the conductive solution in the manifold holes and the solution in the spacers flow path adjacent thereto. As there is no cooling electrolyte solution to dissipate the heat in the gasketed areas between the flow path and the adjacent manifold hole, an overheating occurs in this area. This tendency to burn due to lateral shorting increases as the conductivity of the manifold solution and the total applied voltage per cell pair increases. Since the spacers must function to gasket certain areas of their adjacent membranes they are generally made of pliable materials which are susceptible to damage by heat, i.e. plastic materials such as polyethylene, polyvinyl chloride, etc., such overheating causes a "burning" and ultimately a melting of the plastic material and membranes. Extrusion of the softened plastic into the manifold holes ultimately results in blockage of the flow of electrolyte. Upon terminating the source of current, the resulting cooling in turn causes a fusing of the spacers to the next adjacent membranes, thereby preventing any separation of the component parts without further damage. It will therefore be appreciated that continuous usage of the system is critically hampered by the lateral shorting.

Many ways have been suggested to obviate the heat damage due to lateral shorting. The use of spacer or membrane materials not adversely affected by heat has been found not to be commercially feasible. Accordingly, prior techniques have been directed to means for protecting the heat-sensitive members employed in electrodialysis systems of the character heretofore described.

Generally, prior attempts to obviate the problem have involved the use of gaskets and grommets made of electrically insulating material. With gaskets, a section of the membrane is cut out around the membrane's manifold hole to accommodate the gaskets. Attempts to obviate the problem by using grommets involve fitting the grommet over the lip of the membrane at the manifold hole and cutting out from the adjacent spacers a section around the manifold holes to accommodate the grommet flanges. The use of gaskets or grommets does provide a barrier against the flow of current which is reasonably effective. However, they are difficult to handle and place in position, and they have a tendency to deform and interfere with the hydraulics of the stack of membranes and spacers.

In accordance with the practice of the present invention, it has now been found that heat damage due to lateral shorting can be simply and efficiently avoided by providing electrodes so constructed as to allow current to pass through only certain portions of the adjacent spacer's flow path area. One system of preventing current passage through certain areas of the flow path is to provide the adjacent electrode surface with a similar area of non-conductivity. In general, the non-conductive areas correspond to certain flow path areas defined by the adjacent spacer, especially the spacer's flow area opposite from and in general proximity to the manifold holes. Other means of preventing lateral shorting will be described hereinafter particularly in reference to FIGURES 6 and 7.

In the case of electrodes prepared by coating an electrolytically nonconductive base material with an electrically conductive material, the area of the base material desired to remain non-conductive is not coated. As an example of electrodes prepared by providing a coating of a conductive material, mention may be made of anodes prepared with sheets of an electrolytic valve metal such as tantalum in which a noble metal such as platinum is coated on the surface of the tantalum in those areas where conductivity is desired. Electrodes of this nature are described, for example, in copending application Serial No. 164,159, filed January 3, 1962, now Patent No. 3,117,023. Other electrodes prepared by providing a coating of a conductive material are well known.

In the case of electrodes comprising a sheet of electrolytically conductive material, such as, for example, stainless steel, or "Hastelloy C" (trade name for a nickel alloy manufactured by Haynes Stellite), the electrode may be rendered non-conductive in the desired surface areas by coating with an insulating or non-conductive material, such as plastic or rubber. Where electrodes are fabricated from such conductive base materials it is preferable that the inside edges of any manifold holes located therein be also insulated to prevent leakage of current directly from the electrode into the electrode manifold holes. Any current flowing in the manifold holes between the electrodes does not contribute to the desalting process and results in a net loss of current efficiency. In addition, undesirable electrode reaction products may be introduced into the manifold solution. It is contemplated that other methods of achieving the results of this invention may be utilized, such as for example providing an insulating plastic block 30 having certain areas 31 recessed therein to support a conducting electrode 1 as is shown in FIGURES 6 and 7.

It has been found that the problem of heat damage due to lateral shorting may be obviated if electrodes are provided in the aforementioned manner having areas of non-conductivity corresponding to certain liquid flow areas of the adjacent spacer, said area in particular corresponding to the flow path area located in close proximity to the manifold holes. This area designated in the drawings by reference number 20 will commence from the edge of the flow path area which is opposite to and in proximity to the manifold holes and will extend inwardly into the flow area. This stippled area 20 of non-conductivity or inactivity would still be in contact with flowing electrolyte solution since it is still within a portion of the flow path area of adjacent spacer 2a. However, since this portion is not electrolytically conductive no electrode reactions would be occurring in said area. This non-operating surface 20 should extend inwardly into the flow path area for a distance which is sufficient to prevent lateral shorting under the conditions employed in operating the electrodialysis unit. In the prior art the entire flow path area of the adjacent spacer containing electrolyte solution is completely covered by an electrolytically active electrode surface. This differs from the present invention which is directed to an electrode having a minor area of its liquid contacting surface made non-conductive, with the remaining major area still conductive and actively taking part in the demineralization process. Prior art electrodes are disclosed in U.S. Patents Nos. 2,891,900, 2,758,083, 2,799,644 and many others but these do not completely or satisfactorily give the desired results.

The invention will be best understood with reference to the accompanying drawings. As shown therein, the dash-dotted lines 14 define the area on the electrode 1 that corresponds to the flow path areas of the adjacent spacer 2a. The non-conductive or inactive areas 20 of the electrode 1 are shown as stippled portions whereas the major unstippled area 19 of the defined flow area is conductive. As was previously mentioned, the non-conductive areas 20 extends from the edge of the flow path area opposite to the manifold holes and continues further into the flow path area for a distance sufficient to prevent lateral shorting. Particularly good results have been achieved with inactive areas of about 3 inches wide extending into the flow area. While inactive or non-conductive areas extending less than one inch will lessen the degree of heat damage, it has been found that, generally, with inactive areas less than one inch, at least some heat damage due to lateral shorting will occur. Accordingly, while it is within the scope of the invention to utilize inactive areas substantially less than one inch into the flow path area, in the preferred embodiment the inactive area should be at least one inch. Likewise, it is within the scope of the invention to utilize inactive areas considerably in excess of the 3 inches at which particularly good results have been obtained. However, it will be apparent to those skilled in the art that the inactive areas should not be greater than that necessary to accomplish the desired result, i.e. to prevent lateral shorting. It should be understood that the required non-conductive area will vary in accordance with the conductivity of the solution in the manifold holes, the total applied voltage per cell pair and other factors.

In other words, depending on the operating conditions employed in the electrodialysis process, the inactive areas may be as small as is necessary to provide the degree of protection sought by the practitioner and preferably should be no greater than necessary. Generally, good results have been obtained with inactive areas of from 1 to 3 inches.

Referring now to FIGURE 2 there is shown a more detailed illustration of a spacer and its adjacent electrode, the electrode being one embodiment of this invention. The spacer 2a is shown as a sheet-like member having a continuous cut out portion therein to form a tortuous liquid flow area 12 containing a plurality of flow paths in side-by-side relationship. The plurality of flow paths are channeled from a common inlet hole 10a to a common outlet hole 11a by means of connecting channels 13 and 13a. The fingers or channel dividers 18 are an integral part of the spacer material and are used to support adjacent membranes. The electrode 1 is shown containing a continuous surface area of non-conductivity 20 and 20a which covers the periphery of the electrode and the area around the manifold holes 10, 10a, 11 and 11a. The area on the electrode that corresponds to the liquid flow path 12 of the adjacent spacer is defined by dash-dotted lines 14. In operation, the area encompassed within line 14 would be in contact with electrolyte solution flowing through tortuous path 12 of spacer 2a. It will be noted that the electrode areas 20 lying within the defined flow path are electrolytically non-conductive as is required by the invention as defined herein. Although the essence of the invention is that a specified area 20 which has previously been described be of necessity electrolytically non-conductive, it does not preclude having other areas of non-conductivity. It is apparent that areas 20a of the electrode which are gasketed by the adjacent spacer material could also be electrolytically non-conductive or, for that matter, it could in the alternate be electrolytically conductive since this area plays no part in the electrolytic process. The areas 20a are essentially "dead spots," that is there is no contact with electrolyte solution and therefore will not in any case take part in the electrode reactions.

As was previously mentioned, it is only necessary for purpose of this invention that a specific area 20 which comes within the liquid flow path be electrolytically non-conductive. However, for practical reasons and for ease of fabrication of the novel electrode of this invention, other areas may be non-conductive. In the case where electrode 1 comprises a sheet of electrolytically non-conductive material such as tantalum, it is only necessary that the tantalum surface 19 that is to be conductive be coated with an electrolytically conductive noble metal such as platinum. It would be a waste of precious platinum to coat those areas 20a that are gasketed by the adjacent spacer and therefore the tantalum sheet is not necessarily coated around its periphery and around the area of the manifold holes. The small areas of the electrode which are covered by the fingers or channel separators of the adjacent spacer also obviously need not necessarily be platinized. However for convenience in applying the platinum, it is preferable that area 19 be coated as a continuous unbroken platinized area. Preferably, electrode tab 40 should also be platinized to allow for an improved electrical connection to the D.C. power supply (not shown). In the case where electrode 1 is comprised of a sheet of electrolytically conductive material such as "Hastelloy C," it is only necessary that critical areas 20 be coated with a non-conductive meterial such as rubber. The remaining surface of the "Hastelloy C" may then be left intact.

In FIGURE 3 there is shown a variation of a tortuous path spacer 2a wherein the inlet manifold holes 10 and 10a are located on one side of the spacer and the outlet manifold holes are placed on the opposite side of the spacer. The general area of the adjacent electrode 1 which is to be nonconductive is adjacent to the manifold holes as shown by stippled areas 20 and constitutes a minor area of flow area 14. The remaining major area of flow area 14 which is unstippled remains electrolytically conductive.

FIGURE 4 shows a larger type tortuous spacer 2a wherein the manifold holes are located in the central section of the spacer. In this arrangement the holes 10a and 11a each have two channel cuts 13 and 13a connecting with the two flow path areas adjacent thereto. The non-conducting areas of electrode 1 are shown by stippled areas 20.

FIGURE 5 is another variation of the invention. The spacer 2a has four long rectangular manifold holes around the edges. Inlet manifold hole 10a is connected to the generally rectangular shaped spacer flow path area 12 by a plurality of connecting channels 13. On the opposite side of the spacer is located effluent manifold hole 11a which is similarly connected to the flow path area by channels 13a. In this general type of spacer, plastic screens or expanded material 32 are usually located throughout the spacers flow area 12 to prevent adjacent membrane and/or electrodes from coming in contact with each other. These screens also function as obstructions to cause the liquid passing through the flow path area to assume a turbulent flow and to better distribute the liquid over the flow area. The area of electrode 1 which is not electrolytically conductive covers the inside peripheral portions of the flow area as shown at 20.

FIGURES 6 and 7 show the same general rectangular flow path type of spacer as described in FIGURE 5. The electrode 1 fits into the recess 31 of a plastic block 30. The block is recessed at a depth which is the same as the thickness of the electrode. The rectangular flow area 12 of the adjacent spacer 2a covers the entire electrolytically conductive electrode 1 and also a portion of the non-conductive plastic block are shown at 20. As may be seen, area 20 is located in proximity to the inlet and outlet manifold holes. Although this area is not part of the electrode per se it will function to prevent lateral shorting in the same manner as has previously been described. Only the liquid in contact with electrode 1 will be under the direct action of electrodialysis. The liquid in contact with areas 20 will not be electrolytically acted upon since this area is non-conductive.

While both electrodes may contain the required areas of non-conductivity as has been previously described, it is within the scope of the invention to utilize but one of the novel electrode embodiments of this invention in electrodialysis systems. The spacers and membranes in the other half of the stack, that is, in the half containing a conventional electrode, may be protected from lateral shorting by the systems previously described, i.e. gaskets, grommets, etc.

The following examples show by way of illustration and not by way of limitation the novel electrodes of this invention and their use in electrodialysis systems.

*Example 1*

An electrodialysis system was provided comprising a 100 cell pair "Mark 11–4" stack (trade name of an electrodialysis unit comprising alternating anion-exchange membranes and cation-exchange membrances, each separated by a spacer member and manufactured by Ionics, Incorporated). The electrodes employed in this stack were those of the prior art wherein the entire liquid flow path area is completely covered with an electrolytically active electrode surface. With an electrolyte solution having a specific resistance of 20 ohm-cm. in the manifold, severe lateral shorting was observed at 190 volts at 100° F.

*Example 2*

The electrodialysis system of Example 1 was provided with a special anode consisting of a tantalum sheet coated on one side with platinum and having on said side an unplatinized electrolytically non-conducting area extending about 2 inches inwardly away from the edge of the flow path opposite the manifold holes. The cathode comprised a sheet of stainless steel and a similar area as that of the anode was made non-conductive by applying thereon insulating plastic tape. No lateral shorting was observed at 225 volts.

From the foregoing description, drawing and illustrative examples, it will be seen that the present invention provides a simple and efficient means for preventing lateral shorting. The very simplicity of the present invention afford the further advantages of doing away with the need for extra parts and does not interfere with the hydraulics of the system.

While for purposes of illustration, the novel electrodes of this invention have been described in connection with electrodialysis and electrolytic systems utilizing at least one cell having an anion-exchange membrane and a cation-exchange membrane, it will be appreciated that the electrodes are equally useful in obviating lateral shorting in other types of systems. For example, systems are known which utilize only cation-exchange membranes, only anion-exchange membranes, or neutral (non-permselective) membranes alone or in combination with anion and/or cation exchange membranes. Such systems, as known in the art, are useful, for example, in double decomposition chemical reactions. The novel electrodes are also useful in systems involving a plurality of anion- and cation-exchange membranes wherein the said membranes are not present in equal quantities, i.e. where there are more anion-exchange membranes than cation-exchange membranes, or vice versa. It is therefore to be expressly understood that the electrodes are useful in any systems wherein lateral shorting is a problem and the systems illustrated in the drawings serve only by way of illustration and not by way of limitation to describe the invention.

Accordingly, since certain changes may be made without departing from the scope of the invention herein involved, it is intended that all matter contained in the above description and shown in the accompanying drawings shall be interpreted as illustrative and not in a limiting sense.

What is claimed is:

1. In an electrodialysis apparatus of the character described comprising a plurality of membranes selected from the group consisting of anion-exchange membranes, cation-exchange membranes, and non-permselective membranes, confined between a pair of electrodes consisting of a cathode and a noble metal-coated electrolytic-valve metals anode, said membranes being separated from one another by spacer members, each of said membranes and said spacer members containing manifold inlet means for receiving and electrolyte influent and manifold outlet means for discharging an effluent, said membranes and said spacer members being so constructed and arranged that said inlet means and said outlet means are aligned respectively with one another, said spacer members further containing means for defining a liquid flow path from the inlet means of said member to the outlet means thereof whereby electrolyte influent is caused to flow along and in contact with a membrane or an electrode adjacent thereto; the improvement which comprises said valve metal anode characterized in that the surface area of said anode adjacent to and corresponding to said spacer's flow path opposite from and in general contiguous to said inlet and outlet manifold means is free from noble metal coating and accordingly intrinsically electrolytically non-conductive sufficient to substantially prevent lateral flow of current therethrough, the remaining surface area of said anode within said spacer's flow path area being coated with noble metal and thus electrolytically conductive to allow passage of current in a substantially perpendicular direction through the remaining major portion of said spacer's flow path area.

2. The apparatus as defined in claim 1 wherein the noble metal coated electrolytic-valve metal is tantalum and the electrolytically conductive area is a plainized tantalum metal.

3. Apparatus as defined in claim 1 wherein said areas of non-conductivity correspond to the areas commencing from the edge of the flow path located opposite the manifold inlet and outlet means of said spacer and extending inwardly into the flow path area for a distance of at least one inch in width.

4. Apparatus as defined in claim 3 wherein said areas of non-conductivity are from about one to three inches wide.

References Cited by the Examiner

UNITED STATES PATENTS 1,738,372  12/1929  Edgeworth-Johnstone _ 204—255
2,891,900  6/1959  Kollsman _____ 204—301

FOREIGN PATENTS 827,350  1/1952  Germany.

JOHN H. MACK, *Primary Examiner.*

E. ZAGARELLA, *Assistant Examiner.*